United States Patent Office 3,720,732
Patented Mar. 13, 1973

3,720,732
BIAXIALLY ORIENTED POLYCARBONATE
MODIFIED POLYESTER FILM
Robert J. Sevenich, White Bear Lake, Minn., assignor to Minnesota Mining and Manufacturing Company, St. Paul, Minn.
No Drawing. Continuation-in-part of application Ser. No. 761,817, Sept. 23, 1968. This application Sept. 18, 1970, Ser. No. 73,660
Int. Cl. B29d 7/24; C08d 9/04; C08g 39/10
U.S. Cl. 260—860                    6 Claims

ABSTRACT OF THE DISCLOSURE

Physically blending small amounts of polycarbonate resin into polyethylene terephthalate resin which is to be extruded into a film and thereafter oriented, imparts unexpectedly superior heat stability to the ultimate film. This film also displays improved "slip" properties, not only permitting the omission of conventional hard inorganic slip agents but also attaining a more uniform surface. Electrical properties are also improved.

CROSS-REFERENCE TO RELATED APPLICATION

This application is a continuation-in-part of copending application Ser. No. 761,817, filed Sept. 23, 1968 and now abandoned.

BACKGROUND OF THE INVENTION

This invention relates to modified biaxially oriented polyethylene terephthalate film.

Since it was first developed, polyethylene terephthalate has steadily increased in commercial utility. Biaxially oriented film formed from this polymer is strong, flexible, and widely used in packaging, electrical insulation, and as a backing for pressure-sensitive adhesive tape, magnetic recording tape, and many other products. The thinner and smoother a film is, the greater the tendency for superposed sheets (or adjacent convolutions in a roll) to stick together because of static electricity. Accordingly, it has long been common practice to incorporate a metal-organic salt as a slip agent, in the form of small irregular-shaped granules, in a composition which is to be formed into polyester film. Such inclusions, which are not affected by orientation, tend to protrude above the surface of the polyester film and prevent the intimate contact which causes handling problems. Unfortunately, however, this very characteristic makes it difficult to obtain extremely uniform coatings, which are critical in the manufacture of such products as electrical capacitors or magnetic recording tape.

Insulation resistance is a widely used criterion for evaluating electrical properties of a film. The product of the resistance in ohms and the capacitance in farads is determined at several temperatures; the higher this value the better. Conventional ¼ mil polyester film has insulation resistance of less than 1200 ohm-farads at 125° C.

"Slip" properties are measured in accordance with ASTM Test No. D–1894, Method C, for determining the kinetic coefficient of friction, $\mu_k$, between two film surfaces. This test generally provides for clamping a 4" x 12" strip of film to a glass plate, attaching a 2½" x 4" strip of film to a foam surfaced 200-gram test block to provide a 2½" x 2½" flat surface, placing the two flat film surfaces in contact, and with a spring balance pulling the test block parallel to the surface of the lower strip while measuring the force in grams required to maintain a sliding velocity of 5 inches per minute. The kinetic coefficient of friction, or slip value $$\left(\text{calculated as }\frac{\text{force}}{200}\right)$$

should be lower than about 0.75 and preferably below 0.5 for ease in handling. In some applications surface smoothness is more important than slip, but even here the slip value should be less than 0.75.

Since surface roughness affects film clarity, the effectiveness of a given slip agent can be predicted through the use of an instrument such as the Gardner Pivotable-Sphere Hazemeter, as described in ASTM Method No. 1003. This test provides generally for directing a beam of light at 90° to one face of a film while a light receiver at the opposite face measures all light which is refracted more than 2½°. Haze values of 5–10% indicate that the film will have adequate slip; increasing the haze beyond this value has only a minor effect on the slip properties of ¼ mil film. For ¾ mil film a haze value of 2–5% indicates adequate slip, and 2-mil film will handle satisfactorily at a haze value of 1–3%. Haze values, expressed in percent of total light refracted, indicate to a prospective consumer the clarity of a film in which he might be interested, clarity being of primary concern to many users.

Still another problem involved in the manufacture of biaxially oriented polyethylene terephthalate film is the achievement of a product which has the ability to remain flexible (i.e., not become brittle) when exposed to elevated temperatures. General Electric test E8 D16 is representative of several methods for evaluating this characteristic. In this test a one-inch x five-inch specimen of film is clamped at one end and suspended vertically in a 220° C. forced air oven with a weight equivalent to 200 grams per mil thickness clamped to the free end. Several strips of a given film are placed in the oven, individual strips being removed periodically, allowed to cool and checked for brittleness. The ends where the clamps were affixed are cut off, after which the specimen is folded 180° lengthwise, using finger pressure only to make a crease. The specimen is then unfolded and three crosswise folds made, again using finger pressure. Brittleness is revealed by cracking at the fold.

When subjected to the test described in the preceding paragraph, biaxially oriented polyethylene terephthalate film made from polymers prepared using a zinc-antimony catalyst, fails in less than 15 minutes. This catalyst system is useful because the polyester resin can be prepared quite quickly. To improve thermal stability, however, it is common to make the polyester using a lithium-zinc-antimony catalyst, phosphorus often being included in the catalyst system to improve insulation resistance. Although the polymerization reaction is somewhat slower than with the zinc-antimony catalyst, film made with a catalyst containing lithium (added as lithium acetate but converted ultimately to lithium terephthalate) generally lasts 2–3 hours before becoming embrittled. The insoluble lithium terephthalate forms small granular inclusions which function as a slip agent by causing irregular "bumps" on the surface of the film. Although these bumps facilitate handling, the lithium tends to interfere with the electrical properties which the polyester film would otherwise display.

German Pat. No. 1,187,793 discloses the fact that casting or molding compounds can be formed by blending 5–95 parts of polycarbonate with correspondingly 95–5 parts of polyethylene terephthalate, blending being carried out at 280° C. and injection molding at 280–290° C.; generally no more than 30% polyethylene terephthalate is employed. Belgian Pat. No. 661,680 likewise discloses mixtures of polycarbonate and polyester, the polyester constituent generally varying between about 5 and 70% of the total weight. In each case, the patentees are primarily concerned with the more convenient manufacture of molded articles and with improving the ability of such articles to resist stress and chemical attack.

SUMMARY

The present invention provides modified polyethylene terephthalate polyester film which has the desirable physical and electrical characteristics of unmodified film. In addition, however, the film of this invention displays an outstanding ability to resist exposure to high ambient temperatures for long periods of time; e.g., film has been prepared in accordance with this invention which resists exposure to temperatures of 220° C. for 50 hours or more. Virtually any convenient catalyst system can be used in the manufacture of the polymer, and even modified films based on polyesters prepared with the highly desirable zinc-antimony catalyst are able to resist exposure to 220° C. for several times as long as unmodified polyester films prepared with the previously preferred lithium-zinc-antimony catalyst. It will thus be apparent that the range of application for polyester films has been greatly increased by the invention, making such films useful in high temperature electrical installations, food packaging where the contents of the package may be baked, etc.

In addition to the superior heat resistance possessed by films made in accordance with the invention, dramatic improvement is also obtained in uniformity of surface, permitting the manufacture of higher quality magnetic recording tape than was heretofore possible. Further, film made in accordance with the invention has electrical insulating properties which are appreciably better than those of conventional polyester film. All these advantages can be achieved while still maintaining a high degree of clarity, thus providing a polyester film which is more universally useful than any polyester film heretofore available.

In accordance with the invention, minor amounts of polycarbonate resin (a common form of which is the reaction product of phosgene and bisphenol A having a molecular weight on the order of 25,000–100,000) are blended with polyethylene terephthalate polymer prior to extrusion. The blending can be effected either by adding the polycarbonate to the reaction kettle in which the polyethylene terephthalate has been polymerized or, preferably, by introducing both the polyester and the polycarbonate into the same extruder. When examined under the electron microscope, biaxially oriented films formed from polymer blends of this invention are seen to consist of elongated globules, or platelets, of additive polymer embedded in the polyester. The thickness of the globules ranges from 0.1 to 0.5$\mu$ and the width and length dimensions range from 0.25 to 6.5$\mu$ or larger.

Depending upon the specific physical property which is to be improved, as well as upon the thickness of the ultimate oriented film, as little as ¼% polycarbonate has proved extremely effective, the upper limit being determined largely by a combination of manufacturing convenience, economy, and loss of some specific physical or electrical characteristic. For example, 1-mil film used as the backing for magnetic recording tape desirably contains between ¼% and ⅓% polycarbonate, although thinner film desirably includes a higher percentage of polycarbonate to assure adequate slip. To illustrate, ¼-mil polyester film advantageously contains about 2% polycarbonate by weight to facilitate handling, while ½-mil film achieves comparable results with 1% polycarbonate. If the amount of polycarbonate exceeds about 5%, the haziness of the film increases markedly, detracting from its aesthetic appearance and limiting its uses in packaging and other applications.

It has also been found that 2–3% polycarbonate is entirely adequate to insure excellent electrical properties, higher percentages tending not to be significantly more effective.

If, on the other hand, improvement in heat resistance is the primary objective, up to about 15% polycarbonate may be effectively included in the polyester film. Blending, extrusion and other processing difficulties are increased, however, and it is generally preferred to employ no more than about 10% polycarbonate.

An important processing consideration is the fact that polyester and polycarbonate have some tendency toward mutual solubility and, as previously indicated, to copolymerize if maintained at a high temperature for a long period of time. This reaction gives off $CO_2$ and ultimately results in a polymer which forms a homogeneous film having inadequate slip. It appears that the higher the molecular weight of polyester, the less likely solubilizing is to occur.

Although the reaction between the polyester and polycarbonate resins should be avoided during the blending, film formation, and orientation processes, it presents an extremely valuable advantage in reprocessing trim and scrap. Such film can be introduced into the polymerization reactor, where, under the presence of heat, the polycarbonate degrades to release $CO_2$ (which is removed by vacuum) and copolymerizes into a polyester having substantially the same characteristics as unmodified polyethylene terephthalate. Such is not the case with other polymers which might be blended with polyethylene terephthalate for various purposes. Where film is to be recycled, the amount of polycarbonate preferably does not exceed 5%; if the amount of polycarbonate substantially exceeds 5%, a copolymer having a lower melting point is formed during reprocessing.

DESCRIPTION OF PRESENTLY PREFERRED EMBODIMENTS

The invention will be better understood by reference to the following illustrative but nonlimiting examples, in which all parts are by weight unless otherwise noted.

EXAMPLE 1

In a stainless steel reactor equipped with a distillation column and an agitator, 62 parts of dimethyl terephthalate is transesterified with 44 parts of ethylene glycol, in the presence of 0.018% zinc acetate and 0.025% antimony trioxide. After removing the methanol which is evolved in the reaction, the reaction mixture is raised to 250° C. for 32 minutes, at the end of which time 95% of the theoretical excess of ethylene glycol has been distilled and collected. A vacuum is slowly applied while the prepolymer is rapidly stirred and gradually heated to 280° C. Heating and stirring are continued for one hour after a pressure of 0.5 mm. Hg is obtained, yielding a polyethylene terephthalate resin having an inherent viscosity of about 0.6. The vacuum is reduced to 20–40 mm. Hg and the temperature held at 280° C. for an additional 30 minutes, thereby maintaining the inherent viscosity while, it is believed, achieving a narrower molecular weight distribution; in any event, inclusion of this step greatly improves the reproducibility of the ultimate polymer blend. The vessel is then opened and polycarbonate pellets added, after which the vessel is resealed and the contents stirred for 5–10 minutes at 280° C. The liquid polymer blend is removed from the vessel allowed to cool and solidify, and broken into small chunks for subsequent extrusion.

A polymer blend of polyethylene terephthalate containing 1% bisphenol A polycarbonate is prepared in the manner just described, extruded in a 5-mil sheet, biaxially oriented to a thickness of ½ mil, and subjected to the 220° C. flexibility retention test, haze test, and slip test described hereinabove. Results, compared to a control formed from polyethylene terephthalate alone, are tabulated below;

| Weight percent polycarbonate | Flexibility retention [1] | Haze value, percent | Slip value |
|---|---|---|---|
| 0 (control) | ¼ | 0.5 | 2.0 |
| 1 | 4 | 3 | 0.6 |

[1] Hrs. at 220° C.

Blends of the type just described may alternatively be prepared by grinding polyethylene terephthalate polymer into small chunks, adding polycarbonate pellets thereto, and stirring, shaking, or otherwise agitating the blend to produce a uniform dispersion. The mixture is then dried to remove any water picked up from the atmosphere, extruded as film, and the film then biaxially oriented. Heat aging, slip and haze value are virtually identical.

The preferred way to prepare polymer blends in accordance with the present invention is to "tap" the barrel or feed zone of an extruder used for the preparation of a polyethylene terephthalate film, attaching a second extruder at this location to permit feeding the second polymer into the barrel. This method combines the advantages of rapid and intimate mixing in the extruder screw, simplicity and greatly reduced possibility of any interaction between the two polymers. In addition, the shorter dwell time at melt temperatures decreases any tendency of the polycarbonate to decompose and release $CO_2$.

EXAMPLES 2–13

A family of polymer blends of polyethylene terephthalate made using either a lithium-zinc-antimony-phosphorus or a zinc-antimony catalyst and various amounts of polycarbonate ("Merlon" M–50, commercially available from Mobay Chemical Co.) were prepared in a tapped extruder, extruded sheet, and biaxially oriented to various thicknesses. These films were then subjected to the tests previously mentioned, with the following results:

| Example | Catalyst system | Caliper, mils | Weight percent polycarbonate | Flexibility retention [1] | Haze value, percent | Slip value | Insulation resistance [2] |
|---|---|---|---|---|---|---|---|
| Control | Li-Zn-Sb-P | ¼ | 0 | 2½ | 1.7 | 1.0 | 1,200 |
| 2 | Li-Zn-Sb-P | ¼ | 1.1 | 4 | 5.4 | 0.6 | 1,500 |
| 3 | Li-Zn-Sb-P | ¼ | 1.9 | 4½ | 8.0 | 0.5 | 2,000 |
| 4 | Li-Zn-Sb-P | ¼ | 4.0 | >30 | 30 | 0.4 | 2,400 |
| Control | Zn-Sb | ½ | 0 | ¼ | 0.2 | 2.0 | |
| 5 | Zn-Sb | ½ | 1.3 | 4½ | 7.0 | 0.5 | |
| 6 | Zn-Sb | ½ | 2.5 | 4½ | 10.7 | 0.4 | |
| 7 | Zn-Sb | ½ | 2.9 | 4½ | | | |
| 8 | Zn-Sb | ½ | 4 | 7¾ | | | |
| 9 | Zn-Sb | ½ | 8 | 7 | | | |
| 10 | Zn-Sb | ½ | 8.3 | 3½ | 26 | 0.5 | |
| 11 | Zn-Sb | ½ | 12 | 54 | | | |
| 12 | Zn-Sb | ½ | 12 | 100 | 62 | 0.3 | |
| Control | | ½ | 100 | <¼ | 55 | 0.6 | 6,400 |
| 13 | Zn-Sb | 1 | ¼ | <¼ | 2 | 0.6 | |

[1] Hrs. at 220° C.
[2] Ohm-farads at 125° C.

The improved electrical properties of the polyethylene terephthalate film which contains less than about 5% polycarbonate is believed caused by the fact that the polycarbonate particles, which have a higher resistance than polyethylene terephthalate, extend slightly higher than the main surface of the film; hence, many electrical paths through the film extend through the polycarbonate particles, rather than through the polyethylene terephthalate matrix.

As previously indicated, the polycarbonates formed from the reaction of phosgene and bisphenol A are readily available commercially and have proved especially useful. In addition to the "Merlon" described above, other polycarbonates of this type include the "Lexans," supplied by General Electric. In general, polycarbonates fall into the general class of polymers prepared by reacting a dihydric phenol with a carbonate precursor in the presence of appropriate catalyst. Suitable carbonate precursors include phosgene, bishaloformates, or carbonate esters, while the dihydric phenols may be mononuclear or polynuclear aromatic compounds such as 2,2 bis(4-hydroxyphenyl) propane, hydroquinone, resorcinol, 2,2 bis-(4-hydroxy-phenyl) pentane, 2,4' dihydroxydiphenyl methane, bis-(4-hydroxyphenyl) methane, methane, 1,1 bis-(4-hydroxyphenyl) ethane, 3,3 bis-(4-hydroxyphenyl)pentane, 2,6 dihydroxy naphthalene; bis-(4-hydroxyphenyl) sulfone, 2,4' dihydroxydiphenyl sulfone, bis-(4-hydroxyphenyl) diphenyl disulfone, 4,4' dihydroxydiphenyl ether and 4,4' dihydroxy - 2,5 - diethoxydiphenyl ether. A variety of supplementary dihydric phenols which can be used to furnish these carbonate polymers are mixtures of resins of polycarbonates and polysiloxanes. Two or more different dihydric phenols may also be used, as may a dihydric phenol in combination with a glycol, a polyester terminated by a hydroxy group or acid or a dibasic acid, to obtain a carbonate copolymer rather than a carbonate homopolymer.

It is also to be understood that the terms "polyester" and "polyethylene terephthalate" as used herein include the reaction product of ethylene glycol and dihydric phenol, at least 85% of the phenylene radicals being p-phenylene and up to 15% being m-phenylene.

What is claimed is:

1. A biaxially oriented film having outstanding heat resistance as evidenced by its ability to withstand aging at 220° C., as well as excellent slip properties, formed from a visually uniform blend of 85% to 99¾% by weight polyethylene terephthalate polymer and correspondingly from 15% to ¼% aromatic polycarbonate polymer by weight, the polycarbonate being distributed throughout the film in the form of discrete microscopic particles.

2. The film of claim 1 wherein the polyester contains trace amounts of a zinc-antimony catalyst.

3. Film of claim 1 wherein the polyester contains trace amounts of lithium-zinc-antimony-phosphorus catalyst.

4. The film of claim 1, wherein the polycarbonate is present in an amount equal to at least about 1%, whereby the film displays insulation resistance which is significantly superior to that of unmodified polyethylene terephthalate.

5. The product of claim 1, wherein the amount of polycarbonate present is less than 5% by weight, whereby the film additionally possesses excellent electrical properties and is readily reprocessable.

6. The product of claim 1 wherein the amount of polycarbonate present is no more than about 3% by weight.

References Cited

UNITED STATES PATENTS 3,234,313  2/1966  Miller et al. _____ 264—230
3,563,847  2/1971  Rye et al. _____ 260—860

FOREIGN PATENTS 1,539,880  9/1968  France _____ 260—860

OTHER REFERENCES

Chem. Abst., vol. 70; 115984m, "Oriented poly(ethylene terephthalate) films."

Chem. Abst., vol. 71: 71233e; "Polyesters," Hrach et al.

WILLIAM H. SHORT, Primary Examiner

E. WOODBERRY, Assistant Examiner

U.S. Cl. X.R.

264—230, 288